US009658705B2

(12) United States Patent
Xiang et al.

(10) Patent No.: US 9,658,705 B2
(45) Date of Patent: May 23, 2017

(54) TOUCH CONTROL APPARATUS, CONTROL METHOD THEREOF AND ELECTRONIC DEVICE HAVING TOUCH CONTROL APPARATUS

(75) Inventors: Guowei Xiang, Beijing (CN); Yihai Liang, Beijing (CN); Jian Zhong, Beijing (CN); Xianjun Wang, Beijing (CN); Baijun Song, Beijing (CN); Yanqing Li, Beijing (CN); Feng Yang, Beijing (CN)

(73) Assignee: HANWANG TECHNOLOGY CO., LTD., Haidian District, Beijing (CN)

( * ) Notice: Subject to any disclaimer, the term of this patent is extended or adjusted under 35 U.S.C. 154(b) by 141 days.

(21) Appl. No.: 14/005,082

(22) PCT Filed: Apr. 1, 2011

(86) PCT No.: PCT/CN2011/072374
§ 371 (c)(1),
(2), (4) Date: Nov. 13, 2013

(87) PCT Pub. No.: WO2012/122723
PCT Pub. Date: Sep. 20, 2012

(65) Prior Publication Data
US 2014/0071070 A1 Mar. 13, 2014

(30) Foreign Application Priority Data

Mar. 17, 2011 (CN) .......................... 2011 1 0064952

(51) Int. Cl.
*G06F 3/041* (2006.01)
*G06F 3/043* (2006.01)

(52) U.S. Cl.
CPC ............ *G06F 3/041* (2013.01); *G06F 3/0436* (2013.01)

(58) Field of Classification Search
CPC ............................... G06F 3/041; G06F 3/0436
(Continued)

(56) References Cited

U.S. PATENT DOCUMENTS

| 5,028,745 A * | 7/1991 | Yamanami | G06F 3/046 |
| | | | 178/18.07 |
| 5,220,324 A * | 6/1993 | Morita | G06F 3/046 |
| | | | 178/20.04 |

(Continued)

FOREIGN PATENT DOCUMENTS

| CN | 1581058 A | 2/2005 |
| CN | 201259668 Y | 6/2009 |

OTHER PUBLICATIONS

International Search Report for corresponding International Patent Application No. PCT/CN2011/072374 mailed Apr. 1, 2011.

*Primary Examiner* — Tony Davis
(74) *Attorney, Agent, or Firm* — Merchant & Gould P.C.

(57) ABSTRACT

A touch control apparatus, a control method thereof and an electronic device having the touch control apparatus are disclosed, which belong to the technical field of touch control. The touch control apparatus comprises: a panel (1); a transmitting antenna (2) arranged on the panel (1) and configured to transmit a detection wave for detecting whether the panel (1) is being touched; at least three resonant circuits arranged on the panel and configured to sense the detection wave and generate resonant waves; and a control processing unit (6) configured to control to process the resonant waves and position information of the resonant circuits to obtain corresponding touch information comprising at least a touch pressure and a touch position. The touch control apparatus, the control method thereof and the electronic device enable touch control of the panel by a general object through utilizing the resonant circuits. The present (Continued)

disclosure can be advantageously implemented by simple process at low cost and have wide usage prospect in the touch control field.

17 Claims, 4 Drawing Sheets

(58) Field of Classification Search
USPC .................................................. 345/170–174
See application file for complete search history.

(56) References Cited

U.S. PATENT DOCUMENTS

| | | | | |
|---|---|---|---|---|
| 5,402,151 A * | 3/1995 | Duwaer | ................ | G06F 3/044 178/18.05 |
| 5,657,011 A * | 8/1997 | Komatsu | ................ | G06F 3/046 178/18.07 |
| 5,693,914 A | 12/1997 | Ogawa | | |
| 5,792,997 A * | 8/1998 | Fukuzaki | ................ | G06F 3/046 178/18.07 |
| 5,847,690 A * | 12/1998 | Boie | ................ | G06F 3/044 345/104 |
| 7,498,577 B2 * | 3/2009 | Kurosaka | ................ | G01J 3/42 250/336.1 |
| 8,228,312 B2 * | 7/2012 | Matsubara | ................ | G06F 3/03545 178/18.06 |
| 8,400,419 B2 * | 3/2013 | Rofougaran | ................ | G06F 3/046 178/18.07 |
| 2003/0059068 A1 * | 3/2003 | Bank et al. | ................ | 381/152 |
| 2004/0095333 A1 * | 5/2004 | Morag et al. | ................ | 345/173 |
| 2004/0104899 A1 * | 6/2004 | Hong | ................ | G06F 3/045 345/173 |
| 2004/0105040 A1 * | 6/2004 | Oh | ................ | G02F 1/13338 349/12 |
| 2004/0125312 A1 * | 7/2004 | You | ................ | G02F 1/13338 349/149 |
| 2004/0155871 A1 * | 8/2004 | Perski | ................ | G06F 3/041 345/174 |
| 2004/0189587 A1 * | 9/2004 | Jung | ................ | G02F 1/13338 345/102 |
| 2004/0189887 A1 * | 9/2004 | You | ................ | G02F 1/13338 349/58 |
| 2005/0280638 A1 | 12/2005 | Oda | | |
| 2006/0085159 A1 * | 4/2006 | Itsuji | ................ | G06F 3/042 702/150 |
| 2006/0197021 A1 * | 9/2006 | Ouchi | ................ | G01N 21/3581 250/343 |
| 2006/0227340 A1 * | 10/2006 | Shioda | ................ | G01S 7/4811 356/614 |
| 2007/0170505 A1 * | 7/2007 | Tokunaga | ................ | G06K 19/07703 257/347 |
| 2007/0216668 A1 * | 9/2007 | Miyamoto | ................ | G06F 3/147 345/204 |
| 2008/0142280 A1 * | 6/2008 | Yamamoto | ................ | G06F 3/0416 178/18.02 |
| 2009/0056455 A1 * | 3/2009 | Ouchi | ................ | G01N 21/3581 73/643 |
| 2010/0206644 A1 * | 8/2010 | Yeh | ................ | G06F 3/03545 178/18.07 |
| 2010/0295826 A1 * | 11/2010 | Yeh et al. | ................ | 345/179 |
| 2010/0311356 A1 * | 12/2010 | Rofougaran | ................ | H01Q 1/2283 455/91 |
| 2011/0248724 A1 * | 10/2011 | Sekiguchi | ................ | H01Q 1/248 324/633 |
| 2012/0008303 A1 * | 1/2012 | Hakomori | ................ | G02B 6/4246 361/818 |
| 2012/0050230 A1 * | 3/2012 | Harris | ................ | 345/178 |
| 2012/0127019 A1 * | 5/2012 | Nishiyama | ................ | G01S 13/538 342/93 |
| 2012/0127026 A1 * | 5/2012 | Matsumoto | ................ | G01S 7/10 342/179 |
| 2012/0229407 A1 * | 9/2012 | Harris et al. | ................ | 345/173 |

* cited by examiner

TOUCH CONTROL APPARATUS, CONTROL METHOD THEREOF AND ELECTRONIC DEVICE HAVING TOUCH CONTROL APPARATUS

This application is a National Stage Application of PCT/CN2011/072374, filed 1 Apr. 2011, which claims benefit of Serial No. 201110064952.6, filed 17 Mar. 2011 in China and which applications are incorporated herein by reference. To the extent appropriate, a claim of priority is made to each of the above disclosed applications.

TECHNICAL FIELD

The present disclosure relates to the field of touch control, and particularly, to a touch control apparatus implementing touch control by a general object, a control method thereof, and an electronic device having the touch control apparatus.

BACKGROUND

Electromagnetic touch control was once widely used in early panel-type devices due to its high positioning accuracy and high sensitivity to pressure. However, it has been gradually substituted by currently-prevalent multi-point capacitive touch control because it requires specialized electromagnetic stylus and thus is inconvenient for interaction between a user and the device.

With the wide application of touch control, people are realizing convenience of finger touch control and multi-point touch control. Particularly, the development of mobile phone and tablet computer encourages further exploration of new technology.

Multi-point capacitive touch control screen is the most popular one among various multi-point touch control technologies that are currently used. However, it has certain disadvantages. First, it has to be placed in front of a display screen, which may degrade display effect thereof. The degradation is especially significant for reflective screens. As a result, it can hardly be used in a paper-like display screen such as an electronic-ink screen. Secondly, the touch control object has to be conductive and have a relatively large area to enable the touch control. The user's finger can be used as the touch control object. However, it becomes non-conductive after wearing a glove and thus becomes ineffective as the touch control object. Also, accuracy and sensitivity of the touch control are susceptible to dirt and sweat on the finger. The interaction performance of the multi-point capacitive touch control screen is substantially compromised by these disadvantages. Contrary to the multi-point capacitive touch control screen, the electromagnetic touch control screen is typically arranged at the back side of the display screen and thus is very suitable for the reflective screens such as the electronic ink screen.

As described above, the multi-point capacitive touch control screen and the electromagnetic touch control screen both have certain disadvantages. The multi-point capacitive touch control screen has to be operated by the finger while the electromagnetic touch control screen has to be operated by the electromagnetic stylus. Neither of them can be conveniently operated by an arbitrary object.

SUMMARY

In view of the above disadvantages, there are provided a touch control apparatus, a control method thereof, and an electronic device having the touch control apparatus.

In accordance with a first aspect of the present disclosure, there is provided a touch control apparatus, comprising: a panel; a transmitting antenna arranged on the panel and configured to transmit a detection wave for detecting whether the panel is being touched; at least three resonant circuits arranged on the panel and configured to sense the detection wave so as to generate resonant waves; and a control processing unit configured to control to process the resonant waves and position information of the resonant circuits to obtain corresponding touch information comprising at least a touch pressure and a touch position.

A control method of the touch control apparatus in accordance with the first aspect of the present disclosure comprises: a detection wave transmission step for transmitting, by the transmitting antenna, a detection wave for detecting whether the panel is being touched; a resonant wave generation step for sensing, by the resonant circuits, the detection wave when the resonant circuits are being touched to generate resonant waves; and a touch information obtaining step for controlling, by the control processing unit, to process the resonant waves and position information of the resonant circuits to obtain corresponding touch information comprising at least a touch pressure and a touch position.

In accordance with a second aspect of the present disclosure, there is provided a touch control apparatus, comprising: a panel; a transmitting antenna arranged on the panel and configured to transmit a detection wave for detecting whether the panel is being touched; an electromagnetic stylus configured to sense the detection wave when it touches the panel and generate a first resonant wave; at least three first receiving antennas arranged on the panel and configured to receive the first resonant wave; at least three resonant circuits arranged on the panel and configured to sense the detection wave when the panel is being touched by a second object different from the electromagnetic stylus and generate respective second resonant waves; and a control processing unit configured to control to process the first resonant wave and position information of the first receiving antennas or to process the second resonant waves and position information of the resonant circuits to obtain corresponding touch information.

A control method of the touch control apparatus in accordance with the second aspect of the present disclosure comprises: a detection wave transmission step for transmitting, by the transmitting antenna, a detection wave for detecting whether the panel is being touched; a first resonant wave generation step for sensing, by the electromagnetic stylus, the detection wave when the electromagnetic stylus approaches or touches the panel to generate a first resonant wave; a first resonant wave receiving step for receiving, by the first receiving antennas, the first resonant wave; a second resonant wave generation step for sensing, by the resonant circuits, the detection wave when the resonant circuits are being touched by a second object different from the electromagnetic stylus to generate respective second resonant waves; and a touch information obtaining step for controlling, by the control processing unit, to process the first resonant wave and position information of the first receiving antennas or to process the second resonant waves and position information of the resonant circuits to obtain corresponding touch information.

An electronic device in accordance with the present disclosure has the above-described touch control apparatus.

The touch control apparatus, the control method thereof and the electronic device having the touch control apparatus enable touch control of the panel by a general object through utilizing the resonant circuits. This addresses the defect of the existing touch control screen that cannot be controlled by the general object. The touch control of the touch control screen by the general object can be implemented by obtaining touch information, e.g., touch position of the object, through detecting transient capacitance variation in the resonant circuits when the object is touching the touch control apparatus or the electronic device having the same.

The present disclosure can be advantageously implemented by simple process at low cost.

DETAILED DESCRIPTION

Next, embodiments of the present disclosure will be explained in detail with reference to the drawings. The embodiments are only exemplary and should be not construed as any limitation to the present disclosure.

Figure 1:
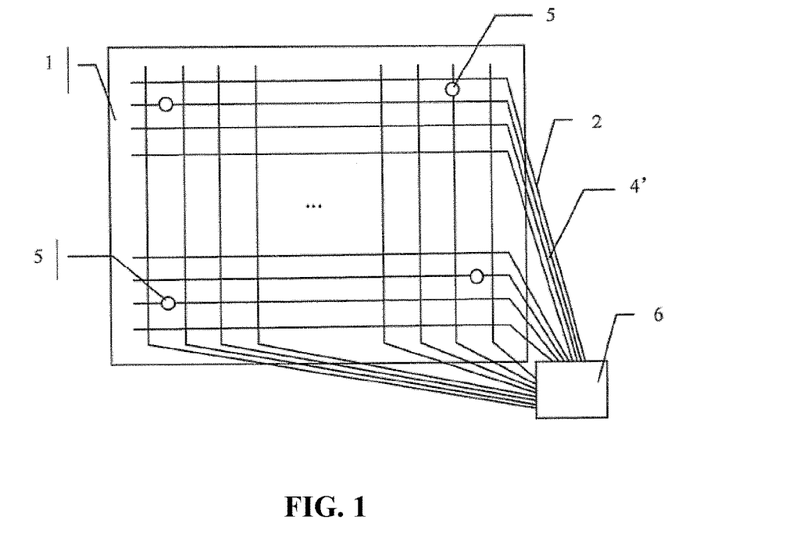
FIG. 1 is a schematic view of a touch control apparatus in accordance with an embodiment of the present disclosure.

In an embodiment of the present disclosure, as shown in FIG. 1, a touch control apparatus comprises a panel 1, at least one transmitting antenna 2, at least three resonant circuits each comprising a receiving antenna 4' and at least one signal sheet 5 connected with the receiving antenna 4', and a control processing unit 6.

The at least one transmitting antenna 2, the receiving antennas 4' and the signal sheets 5 are all arranged on the panel 1, for example, on its back side or lateral side, or embedded in it.

The at least one transmitting antenna 2 may each transmit a detection wave for detecting whether the panel 1 is touched. The detection wave may be a square wave having a base frequency f or a sinusoid wave having a frequency f1'. The detection wave may be any other suitable signal.

The signal sheet 5 is a sheet-like component having a pressure-sensitive capacitance value. The capacitance value of the signal sheet 5 varies in accordance with a pressure applied thereon. The signal sheet 5 may also have an acousto-electric or electric-acoustic characteristic to improve positioning accuracy and user experience of touch control. The resonant circuit senses the square wave having the base frequency f or the sinusoid wave having the frequency f1' transmitted from the transmitting antenna 2 when it is touched to generate a resonant wave having the frequency f or f1', respectively.

The panel 1 may be a display screen or a transparent panel. Particularly, the panel 1 may be an electronic ink screen.

The numbers and positions of the transmitting antenna 2, the receiving antennas 4', and the signal sheets 5 can be properly set to implement touch control by a finger or a general object through detecting physical change induced by touch of the finger or the general object without degrading display effect.

The control processing unit 6 controls to process the resonant waves and position information of the resonant circuits to obtain corresponding touch information comprising a touch pressure and a touch position.

Particularly, the control processing unit 6 selects at least three receiving antennas 4', of which the respective signal strengths have the largest variations induced by the touch. Then the control processing unit 6 uses the signal strengths and the position information of the receiving antennas 4' as initial parameters of a conic curve to calculate conic approximation to obtain corresponding touch information comprising at least a touch pressure and a touch position. In particular, the conic curve is depicted by taking the position information of the receiving antennas 4' as the x-axis of the conic curve and the signal strengths of the receiving antennas 4' as the y-axis of the conic curve. The touch position is obtained by calculating the apex or nadir of the conic curve. The touch pressure is obtained by calculating the amplitude of the conic curve. The conic curve may be a parabolic curve, a single strand of hyperbolic curve, or any other suitable conic curve.

Figure 2:
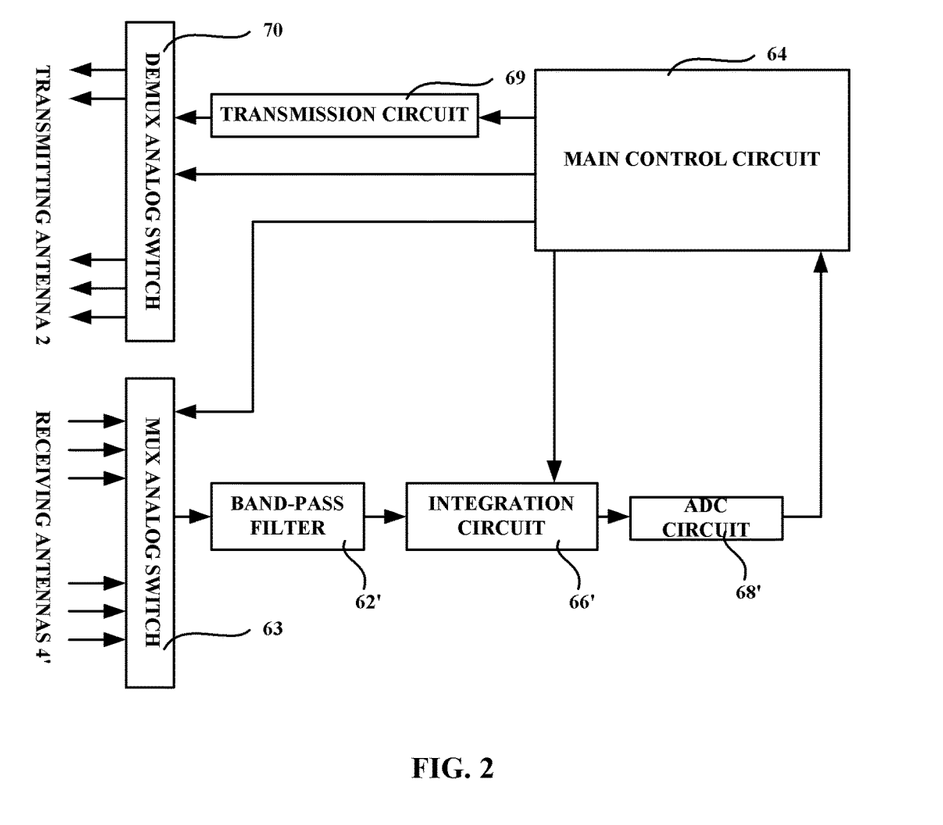
FIG. 2 is a schematic view of a control processing unit of a touch control apparatus in accordance with an embodiment of the present disclosure.

As shown in FIG. 2, the control processing unit 6 comprises a band-pass filter 62'. The band-pass filter 62' passes the resonant waves.

The control processing unit 6 also comprises a MUX analog switch 63. The receiving antennas 4' in the resonant circuits are connected to an input of the band-pass filter 62' directly or via the MUX analog switch 63. A specific receiving antenna 4' is selected by the MUX analog switch 63.

The control processing unit 6 also comprises an integration circuit 66', an analog-to-digital conversion (ADC) circuit 68', a main control circuit 64, a transmission circuit 69, and a DEMUX analog switch 70.

The transmission circuit 69 selects a specific transmitting antenna 2 to transmit the detection wave using the DEMUX analog switch 70 under control of the main control circuit 64.

The band-pass filter 62' has an output connected to an input of the integration circuit 66'. An output of the integration circuit 66' is connected to an input of the ADC circuit 68'.

A specific receiving antenna 4' is selected by the MUX analog switch 63. The main control circuit 64 then may process the signal output from the ADC circuit 68' and the position information of the at least three receiving antenna 4' having the largest signal strength variations to obtain the touch information comprising at least the touch pressure and the touch position.

Figure 3:
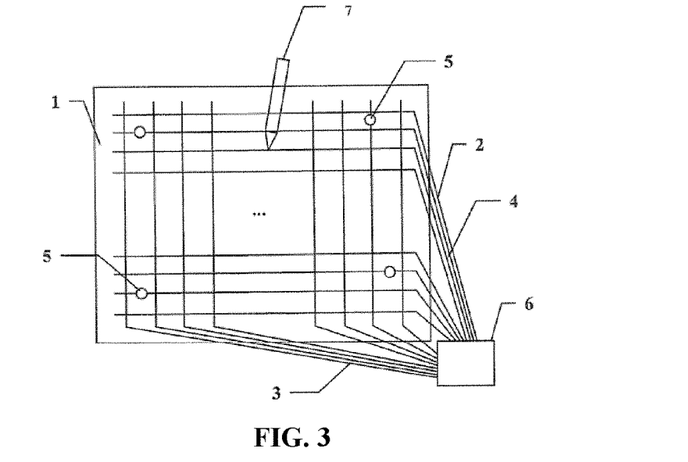
FIG. 3 is a schematic view of a touch control apparatus in accordance with a further embodiment of the present disclosure.

In a further embodiment of the present disclosure, as shown in FIG. 3, a touch control apparatus comprises a panel 1, at least one transmitting antenna 2, an electromagnetic stylus 7, at least three first receiving antennas 3, at least three resonant circuits each comprising a receiving antenna 4 and at least one signal sheet 5 connected with the receiving antenna 4, and a control processing unit 6.

The at least one transmitting antenna 2, the first receiving antennas 3, the receiving antennas 4 and the signal sheets 5 are all arranged on the panel 1, for example, on its back side or lateral side, or embedded in it.

The at least one transmitting antenna 2 may each transmit a detection wave for detecting whether the panel 1 is touched. The detection wave may be a square wave having a base frequency f or a sinusoid wave having a frequency f1. The detection wave may be any other suitable signal.

The electromagnetic stylus senses, in the square wave having the base frequency f or the sinusoid wave having the frequency f1, a harmonic wave having a frequency $3f$ or a sinusoid wave having a frequency f3, respectively, when it touches the panel 1, so as to generate a first resonant wave having the frequency $3f$ or f3, respectively.

The at least three first receiving antennas 3 may each receive the first resonant wave having the frequency $3f$ or f3.

The transmitting antenna may also be used as the receiving antennas by transmitting the detection wave and receiving the resonant wave in a time-divisional manner. In this way, the number of antennas can be reduced.

The signal sheet 5 is a sheet-like component having a pressure-sensitive capacitance value. The capacitance value of the signal sheet 5 varies in accordance with a pressure applied thereon. The signal sheet 5 may also have an acousto-electric or electric-acoustic characteristic to improve positioning accuracy and user experience of touch control. The resonant circuit senses the square wave having the base frequency f or the sinusoid wave having the frequency f1 transmitted from the transmitting antenna 2 when it is touched by a second object different from the electromagnetic stylus to generate a second resonant wave having the frequency f or f1.

The panel 1 may be a display screen or a transparent panel. Particularly, the panel 1 may be an electronic ink screen.

The numbers and positions of the transmitting antenna 2, the first receiving antennas 3, the second receiving antennas 4, and the signal sheets 5 can be properly set to implement touch control by a finger or a general object through detecting physical change induced by touch of the finger or the general object without degrading display effect. Also, precise writing of the electromagnetic stylus can be implemented by utilizing electromagnetic positioning technology.

The control processing unit 6 controls to process the first resonant wave and position information of the first receiving antennas 3 or the second resonant waves and position information of the resonant circuits to obtain corresponding touch information comprising a touch pressure and a touch position.

Particularly, the control processing unit 6 selects at least three first receiving antennas 3 or at least three second receiving antennas 4, of which the respective signal strengths have the largest variations induced by the touch. Then the control processing unit 6 uses the respective signal strengths and the position information of first receiving antennas 3 or the receiving antennas 4 as initial parameters of a conic curve to calculate conic approximation to obtain corresponding touch information comprising at least a touch pressure and a touch position. In particular, the conic curve is depicted by taking the position information of the receiving antennas as the x-axis of the conic curve and the signal strengths of the receiving antennas as the y-axis of the conic curve. The touch position is obtained by calculating the apex or nadir of the conic curve. The touch pressure is obtained by calculating the amplitude of the conic curve. The conic curve may be a parabolic curve, a single strand of hyperbolic curve, or any other suitable conic curve.

Figure 4:
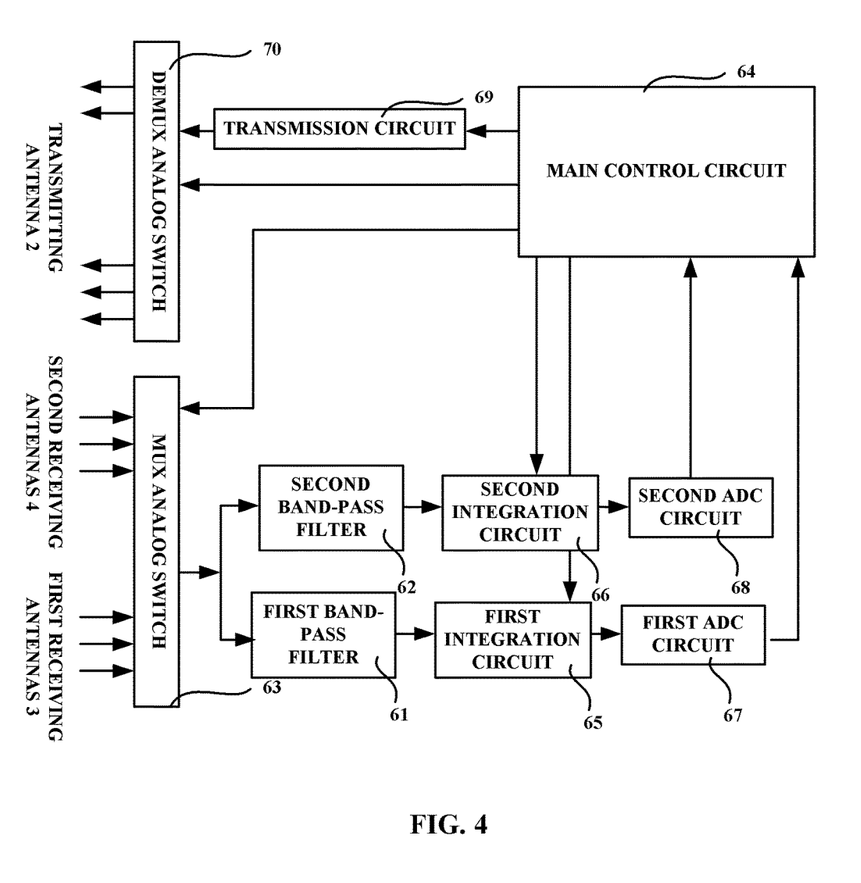
FIG. 4 is a schematic view of a control processing unit of a touch control apparatus in accordance with a further embodiment of the present disclosure.

As shown in FIG. 4, the control processing unit 6 comprises a first band-pass filter 61 and a second band-pass filter 62. The first band-pass filter 61 passes the first resonant wave and the band-pass filter 62 passes the resonant waves.

The control processing unit 6 also comprises a MUX analog switch 63. The first receiving antennas 3 are connected to an input of the first band-pass filter 61 directly or via the MUX analog switch 63. The second receiving antennas 4 in the resonant circuits are connected to an input of the band-pass filter 62 directly or via the MUX analog switch 63. A specific first receiving antenna 3 or second receiving antenna 4 is selected by the MUX analog switch 63.

The control processing unit 6 also comprises a first integration circuit 65, a second integration circuit 66, a first analog-to-digital conversion (first ADC) circuit 67, a second analog-to-digital conversion (second ADC) circuit 68, a main control circuit 64, a transmission circuit 69, and a DEMUX analog switch 70.

The transmission circuit 69 selects a specific transmitting antenna 2 to transmit the detection wave using the DEMUX analog switch 70 under control of the main control circuit 64.

The first band-pass filter 61 has an output connected to an input of the first integration circuit 65. An output of the first integration circuit 65 is connected to an input of the first ADC circuit 67.

The second band-pass filter 62 has an output connected to an input of the second integration circuit 66. An output of the second integration circuit 66 is connected to an input of the second ADC circuit 68.

A specific first receiving antenna 3 or a specific second receiving antenna 4 is selected by the MUX analog switch 63. The main control circuit 64 then may process the signal output from the first ADC circuit 67 and the position information of the at least three first receiving antenna 3 having the largest signal strength variations or the signal output from the second ADC circuit 68 and the position information of the at least three second receiving antenna 4 having the largest signal strength variations, so as to obtain the touch information comprising at least the touch pressure and the touch position.

An electronic device in accordance with the present disclosure may have the touch control apparatus in the above-described embodiments. Particularly, the electronic device in accordance with the present disclosure may be an electronic reader, a tablet computer, a panel display, or a mobile phone having the above-described touch control apparatus.

Next, a touch control method of a touch control apparatus in accordance with an embodiment will be explained with reference to a specific example. In this example, there are m transmitting antennas 2, n first receiving antennas, and k second receiving antennas, wherein m is a natural number no less than 1, and n and k are natural numbers larger than 2, respectively.

Figure 5:
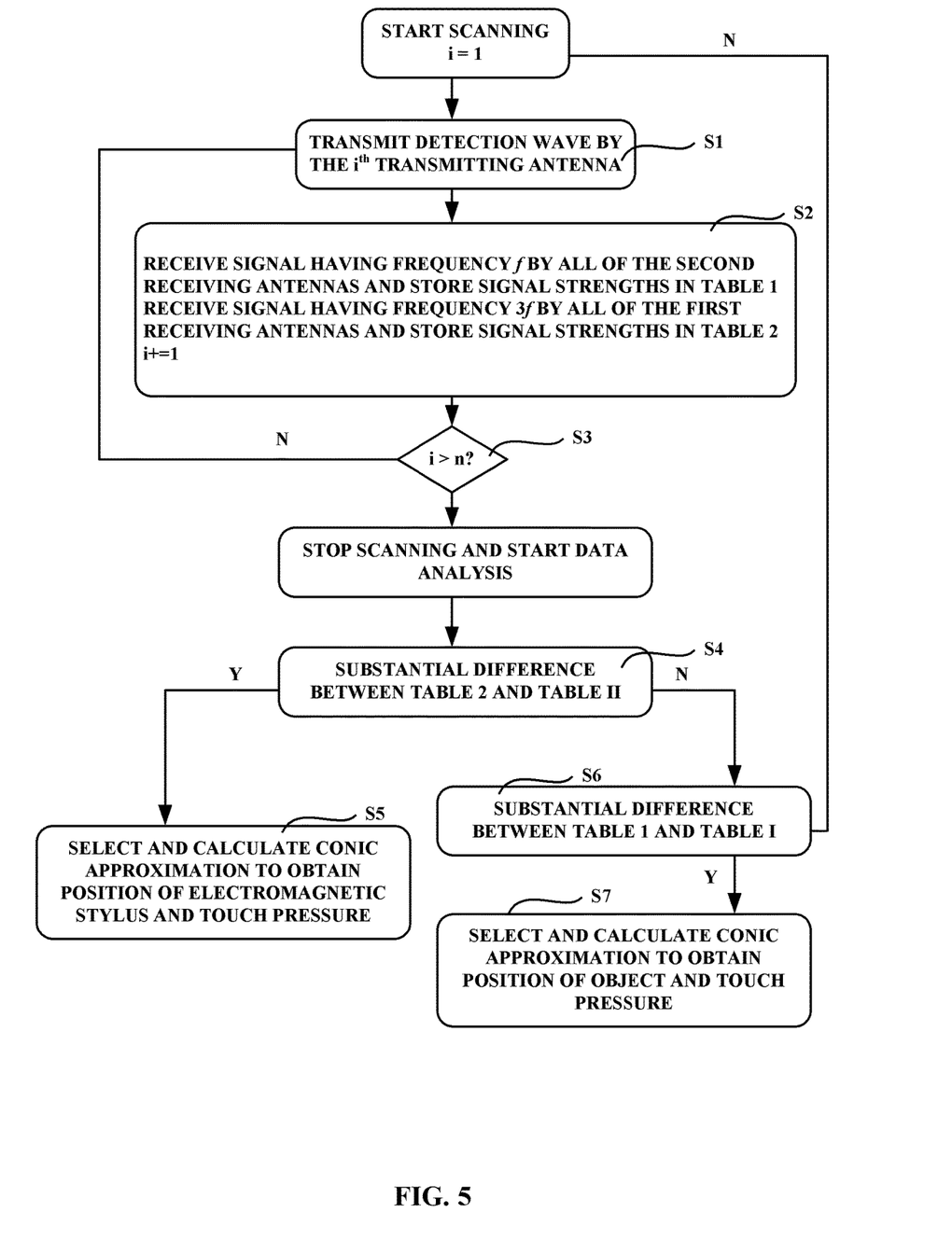
FIG. 5 is a flow chart of a control method of a touch control apparatus in accordance with an embodiment of the present disclosure.

In the example as shown in FIG. 5, the control method comprises the following steps.

In step S1, one transmitting antenna 2 transmits a square wave signal having a base frequency f.

In step S2, all of the second receiving antennas 4 receive a harmonic wave signal having a frequency f. All of the first receiving antennas 3 receive a harmonic wave signal having a frequency $3f$ in the square wave signal having the base frequency f. The control processing unit 6 obtains signal strengths of all the second receiving antennas 4 and the first receiving antennas 3 and stores the signal strengths of the second receiving antennas 4 in table 1 and the signal strengths of the first receiving antennas 3 in table 2.

In step S3, another transmitting antenna 2 is selected and the process returns to step S1. The process is repeated until all transmitting antennas have been selected.

In step S4, m×n signal strengths in the table 2 are compared with an initialization table II. The process proceeds to step S6 if there is no substantial difference, which means the signal strengths contain tolerable noise. Otherwise the process proceeds to step S5. The initialization table II is a table containing m×n signal strengths obtained by averaging the signal strengths from all of the first receiving antennas 3 through repeating steps S1~S3 for multiple times without presence of any touch or electromagnetic stylus.

In step S5, two groups of first receiving antennas 3 are selected having the largest signal strength variations. As shown in FIG. 3, one group may comprise at least three horizontally-arranged first receiving antennas 3, while the other group may comprise at least three perpendicularly-arranged first receiving antennas 3. Conic approximation is calculated using the signal strengths and position information of the selected first receiving antennas 3 to obtain touch position and touch pressure of the electromagnetic stylus. Then the process returns to step S1.

In step S6, m×k signal strengths in the table 1 are compared with an initialization table I. The process returns to step S1 if there is no substantial difference, which means the signal strengths contain tolerable noise. Otherwise the process proceeds to step S7. The initialization table I is a table containing m×k signal strengths obtained by averaging the signal strengths from all of the second receiving antennas 4 through repeating steps S1~S3 for multiple times without presence of any touch or electromagnetic stylus.

In step S7, two groups of second receiving antennas 4 are selected having the largest signal strength variations. As shown in FIG. 3, one group may comprise at least three horizontally-arranged second receiving antennas 4, while the other group may comprise at least three perpendicularly-arranged second receiving antennas 4. Conic approximation is calculated using the signal strengths and position information of the selected second receiving antennas 4 to obtain touch position and touch pressure of the electromagnetic stylus. Then the process returns to step S1.

In steps S5 and S7, the conic curve may be a parabolic curve, a single stand of hyperbolic curve or any other suitable conic curve.

Figure 6:
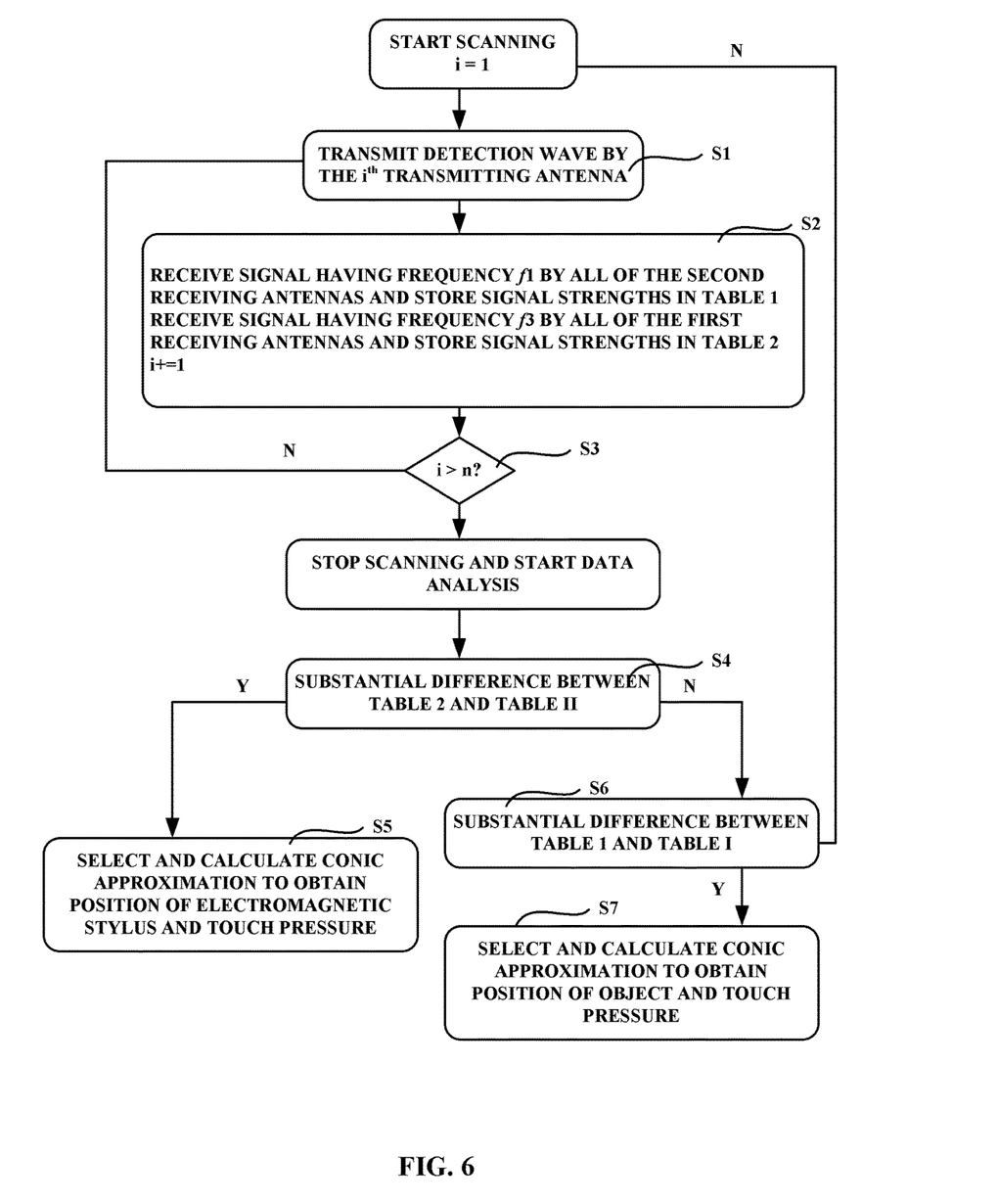
FIG. 6 is a flow chart of a control method of a touch control apparatus in accordance with a further embodiment of the present disclosure.

In the example as shown in FIG. 6, the control method comprises the following steps.

In step S1, one transmitting antenna 2 transmits a square wave signal having a base frequency f1 and a sinusoid wave signal having a frequency f3 alternately.

In step S2, all of the second receiving antennas 4 receive a harmonic wave signal having the frequency f1. All of the first receiving antennas 3 receive a harmonic wave signal having the frequency f3. The control processing unit 6 obtains signal strengths of all the second receiving antennas 4 and the first receiving antennas 3 and stores the signal strengths of the second receiving antennas 4 in table 1 and the signal strengths of the first receiving antennas 3 in table 2.

In step S3, another transmitting antenna 2 is selected and the process returns to step S1. The process is repeated until all transmitting antennas have been selected.

In step S4, m×n signal strengths in the table 2 are compared with an initialization table II. The process proceeds to step S6 if there is no substantial difference, which means the signal strengths contain tolerable noise. Otherwise the process proceeds to step S5. The initialization table II is a table containing m×n signal strengths obtained by averaging the signal strengths from all of the first receiving antennas 3 through repeating steps S1~S3 for multiple times without presence of any touch or electromagnetic stylus.

In step S5, two groups of first receiving antennas 3 are selected having the largest signal strength variations. As shown in FIG. 3, one group may comprise at least three horizontally-arranged first receiving antennas 3, while the other group may comprise at least three perpendicularly-arranged first receiving antennas 3. Conic approximation is calculated using the signal strengths and position information of the selected first receiving antennas 3 to obtain touch position and touch pressure of the electromagnetic stylus. Then the process returns to step S1.

In step S6, m×k signal strengths in the table 1 are compared with an initialization table I. The process returns to step S1 if there is no substantial difference, which means the signal strengths contain tolerable noise. Otherwise the process proceeds to step S7. The initialization table I is a table containing m×k signal strengths obtained by averaging the signal strengths from all of the second receiving antennas 4 through repeating steps S1~S3 for multiple times without presence of any touch or electromagnetic stylus.

In step S7, two groups of second receiving antennas 4 are selected having the largest signal strength variations. As shown in FIG. 3, one group may comprise at least three horizontally-arranged second receiving antennas 4, while the other group may comprise at least three perpendicularly-arranged second receiving antennas 4. Conic approximation is calculated using the signal strengths and position information of the selected second receiving antennas 4 to obtain touch position and touch pressure of the electromagnetic stylus. Then the process returns to step S1.

In steps S5 and S7, the conic curve may be a parabolic curve, a single stand of hyperbolic curve or any other suitable conic curve.

The embodiments of the present disclosure have been described as above. Those skilled in the art will understand that various changes, modifications, substitutions and variations can be made to these embodiments without departing from the principle and spirit of the present disclosure. The scope of the present disclosure is defined by the attached claims and equivalents thereof.

We claim:

1. A touch control apparatus, comprising:
   a panel;
   a transmitting antenna arranged on the panel and configured to transmit an electromagnetic detection wave for detecting whether the panel is being touched;
   at least three resonant circuits arranged on the panel and configured to sense the electromagnetic detection wave, which is generated by the transmitting antenna, so as to generate electromagnetic resonant waves; and
   a control processing unit configured to control to process the electromagnetic resonant waves and position information of the resonant circuits to obtain corresponding touch information comprising at least a touch pressure and a touch position, wherein:
   the control processing unit comprises:
   a band-pass filter configured to pass the electromagnetic resonant waves, the resonant circuits are connected with an input of the band-pass filter directly or via a MUX analog switch in the control processing unit;
   an integration circuit having an input connected with an output of the band-pass filter;

an analog-to-digital conversion circuit having an input connected with an output of the integration circuit; and a main control circuit configured to process signals output from the analog-to-digital conversion circuit and position information of the resonant circuits to obtain the touch information.

2. The touch control apparatus according to claim 1, wherein each of the resonant circuits comprises:
a receiving antenna; and
at least one signal sheet connected with the receiving antenna, wherein the signal sheet is a sheet-like component having a pressure-sensitive capacitance or a sheet-like component having an acousto-electric or electric-acoustic characteristic.

3. The touch control apparatus according to claim 1, wherein the transmitting antenna and the resonant circuits are arranged at a back or lateral side of the panel, or embedded in the panel.

4. An electronic device comprising a touch control apparatus according to claim 1.

5. A control method of a touch control apparatus comprising a panel, a transmitting antenna and at least three resonant circuits arranged on the panel, and a control processing unit, the control method comprising:
an electromagnetic detection wave transmission step for transmitting, by the transmitting antenna, an electromagnetic detection wave for detecting whether the panel is being touched;
an electromagnetic resonant wave generation step for sensing, by the resonant circuits, the electromagnetic detection wave, which is transmitted from the transmitting antenna, when the resonant circuits are being touched to generate electromagnetic resonant waves; and
a touch information obtaining step for controlling, by the control processing unit, to process the electromagnetic resonant waves and position information of the resonant circuits to obtain corresponding touch information comprising at least a touch pressure and a touch position, the touch information obtaining step comprising:
outputting the electromagnetic resonant waves from the resonant circuits to a band-pass filter configured to pass the electromagnetic resonant waves, directly or via a MUX analog switch in the control processing unit;
outputting the electromagnetic resonant waves from the band-pass filter in the control processing unit to an integration circuit of the control processing unit;
outputting the output signal from integration circuit in the control processing unit to the analog-to-digital conversion circuit; and
processing, using a main control circuit in the control processing unit, signals output from the analog-to-digital conversion circuit and position information of the resonant circuits to obtain the touch information.

6. The control method according to claim 5, wherein in the electromagnetic detection wave transmission step, the electromagnetic detection wave comprises a square wave signal having a base frequency equal a frequency of the electromagnetic resonant waves or a sinusoid wave signal having a frequency equal the frequency of the electromagnetic resonant waves.

7. The control method according to claim 6, wherein in the touch information obtaining step, the control processing unit selects at least three resonant circuits having largest signal strength variations induced by a touch and calculates conic approximation using signal strengths and position information of the selected resonant circuits as initial parameters of a conic curve to obtain the corresponding touch information comprising at least the touch pressure and the touch position.

8. A touch control apparatus, comprising:
a panel;
a transmitting antenna arranged on the panel and configured to transmit an electromagnetic detection wave for detecting whether the panel is being touched;
an electromagnetic stylus configured to sense the electromagnetic detection wave, which is transmitted from the transmitting antenna, when it approaches or touches the panel and generate a first electromagnetic resonant wave;
at least three first receiving antennas arranged on the panel and configured to receive the first electromagnetic resonant wave;
at least three resonant circuits arranged on the panel and configured to sense the electromagnetic detection wave, which is transmitted from the transmitting antenna, when the panel is being touched by a second object different from the electromagnetic stylus and generate respective second electromagnetic resonant waves; and
a control processing unit configured to control to process the first electromagnetic resonant wave and position information of the first receiving antennas or to process the second electromagnetic resonant waves and position information of the resonant circuits to obtain corresponding touch information, the control processing unit comprising:
a first band-pass filter configured to pass the first electromagnetic resonant wave; and
a second band-pass filter configured to pass the second electromagnetic resonant waves.

9. The touch control apparatus according to claim 8, wherein each of the resonant circuits comprises:
a second receiving antenna; and
at least one signal sheet connected with the second receiving antenna, wherein the signal sheet is a sheet-like component having a pressure-sensitive capacitance or a sheet-like component having an acousto-electric or electric-acoustic characteristic.

10. The touch control apparatus according to claim 8, wherein:
the transmitting antenna, the first receiving antennas, and the resonant circuits are arranged at a back or lateral side of the panel, or embedded in the panel; and/or
the transmitting antenna is also configured as the receiving antennas by transmitting the detection wave and receiving the first electromagnetic resonant wave in a time-divisional manner under control of the control processing unit.

11. The touch control apparatus according to claim 8, wherein the first receiving antennas are connected with an input of the first band-pass filter directly or via a MUX analog switch in the control processing unit.

12. The touch control apparatus according to claim 8, wherein the resonant circuits are connected with an input of the second band-pass filter directly or via a MUX analog switch in the control processing unit.

13. The touch control apparatus according to claim 8, wherein the control processing unit further comprises:
a first integration circuit having an input connected with an output of the first band-pass filter;

a first analog-to-digital conversion circuit having an input connected with an output of the first integration circuit;

a second integration circuit having an input connected with an output of the second band-pass filter;

a second analog-to-digital conversion circuit having an input connected with an output of the second integration circuit; and a main control circuit configured to process signals output from the first analog-to-digital conversion circuit and position information of the first receiving antennas or to process signals output from the second analog-to-digital conversion circuit and position information of the resonant circuits to obtain the touch information.

14. A control method of a touch control apparatus comprising a panel, a transmitting antenna, at least three first receiving antennas, and at least three resonant circuits arranged on the panel, an electromagnetic stylus, and a control processing unit, the control method comprising:

an electromagnetic detection wave transmission step for transmitting, by the transmitting antenna, an electromagnetic detection wave for detecting whether the panel is being touched;

a first electromagnetic resonant wave generation step for sensing, by the electromagnetic stylus, the electromagnetic detection wave, which is transmitted from the transmitting antenna, when the electromagnetic stylus approaches or touches the panel to generate a first electromagnetic resonant wave;

a first electromagnetic resonant wave receiving step for receiving, by the first receiving antennas, the first electromagnetic resonant wave;

a second electromagnetic resonant wave generation step for sensing, by the resonant circuits, the electromagnetic detection wave, which is transmitted from the transmitting antenna, when the resonant circuits are being touched by a second object different from the electromagnetic stylus to generate respective second electromagnetic resonant waves;

passing the first electromagnetic wave through a first bandpass filter in the control processing unit;

passing the second electromagnetic wave through a second band pass filter in the control processing unit; and a touch information obtaining step for controlling, by the control processing unit, to process the first electromagnetic resonant wave and position information of the first receiving antennas or to process the second electromagnetic resonant waves and position information of the resonant circuits to obtain corresponding touch information comprising at least a touch pressure and a touch position.

15. The control method according to claim 14, wherein in the detection wave transmission step, the detection wave comprises:

a square wave signal having a base frequency equal a frequency of the second electromagnetic resonant waves; or a sinusoid wave signal having a frequency equal that of the second electromagnetic resonant waves and a sinusoid wave signal having a frequency equal that of the first electromagnetic resonant wave, which are transmitted by the transmitting antenna alternately.

16. The control method according to claim 15, wherein a difference between the frequency of the first electromagnetic resonant wave and that of the second electromagnetic resonant waves is large enough that the first electromagnetic resonant wave and the second electromagnetic resonant waves do not interfere each other.

17. The control method according to claim 14, wherein in the touch information obtaining step, the control processing unit selects at least three first receiving antennas or at least three resonant circuits having largest signal strength variations induced by a touch and calculates conic approximation using respective signal strengths and position information of the selected first receiving antennas or resonant circuits as initial parameters of a conic curve to obtain the corresponding touch information comprising at least the touch pressure and the touch position.

\* \* \* \* \*